US012607523B2

(12) United States Patent
Wang et al.

(10) Patent No.: US 12,607,523 B2
(45) Date of Patent: Apr. 21, 2026

(54) TEMPERATURE SENSING DEVICE AND CALIBRATION METHOD THEREOF

(71) Applicants: Global Unichip Corporation, Hsinchu (TW); Taiwan Semiconductor Manufacturing Company, Ltd., Hsinchu (TW)

(72) Inventors: Ting-Hao Wang, Hsinchu (TW); Jun-Wan Wu, Hsinchu (TW); Pei-Ju Lin, Hsinchu (TW)

(73) Assignees: Global Unichip Corporation, Hsinchu (TW); Taiwan Semiconductor Manufacturing Company, Ltd., Hsinchu (TW)

( * ) Notice: Subject to any disclaimer, the term of this patent is extended or adjusted under 35 U.S.C. 154(b) by 455 days.

(21) Appl. No.: 18/330,384

(22) Filed: Jun. 7, 2023

(65) Prior Publication Data

US 2024/0344901 A1     Oct. 17, 2024

(30) Foreign Application Priority Data

Apr. 14, 2023     (TW) .................................. 112113966

(51) Int. Cl.
*G01K 15/00*          (2006.01)

(52) U.S. Cl.
CPC .................................. *G01K 15/005* (2013.01)

(58) Field of Classification Search
CPC .............................. G01K 15/005; G01K 15/00
See application file for complete search history.

(56) References Cited

U.S. PATENT DOCUMENTS

| | | | | | |
|---|---|---|---|---|---|
| 10,962,426 | B2 * | 3/2021 | Wu | ........................ | G01L 25/006 |
| 2013/0249615 | A1 * | 9/2013 | Lai | ........................ | G01R 29/023 |
| | | | | | 327/172 |
| 2015/0355034 | A1 * | 12/2015 | Cho | ........................ | G01K 7/18 |
| | | | | | 374/185 |

FOREIGN PATENT DOCUMENTS

| | | | | | |
|---|---|---|---|---|---|
| CN | 103812344 | A * | 5/2014 | .......... | H02M 3/1588 |
| CN | 112904799 | A * | 6/2021 | .......... | G05B 19/406 |
| CN | 113834576 | A * | 12/2021 | .............. | G01K 3/00 |
| KR | 102006343 | B1 * | 10/2019 | .............. | G01L 1/20 |
| KR | 20220023240 | A * | 3/2022 | ............. | G06F 3/044 |
| TW | 201136698 | A * | 11/2011 | | |

* cited by examiner

*Primary Examiner* — Laura Martin
*Assistant Examiner* — Julia Fitzpatrick
(74) *Attorney, Agent, or Firm* — JCIPRNET

(57)          ABSTRACT

A temperature sensing device and a calibration method of the temperature sensing device are provided. Based on different conditions, the temperature sensing device generates a first digital sensing value and a second digital sensing value corresponding to an ambient temperature. The temperature sensing device generates a first sensing result value according to the first digital sensing value, a first compensation value, and a sensing difference value between the first digital sensing value and the second digital sensing value, and generates a second sensing result value according to the second digital sensing value, a second compensation value, and the sensing difference value. The temperature sensing device obtains an error from the first sensing result value and the second sensing result value according to a first reference value and a second reference value. The temperature sensing device calibrates the first compensation value according to the error.

14 Claims, 4 Drawing Sheets

100

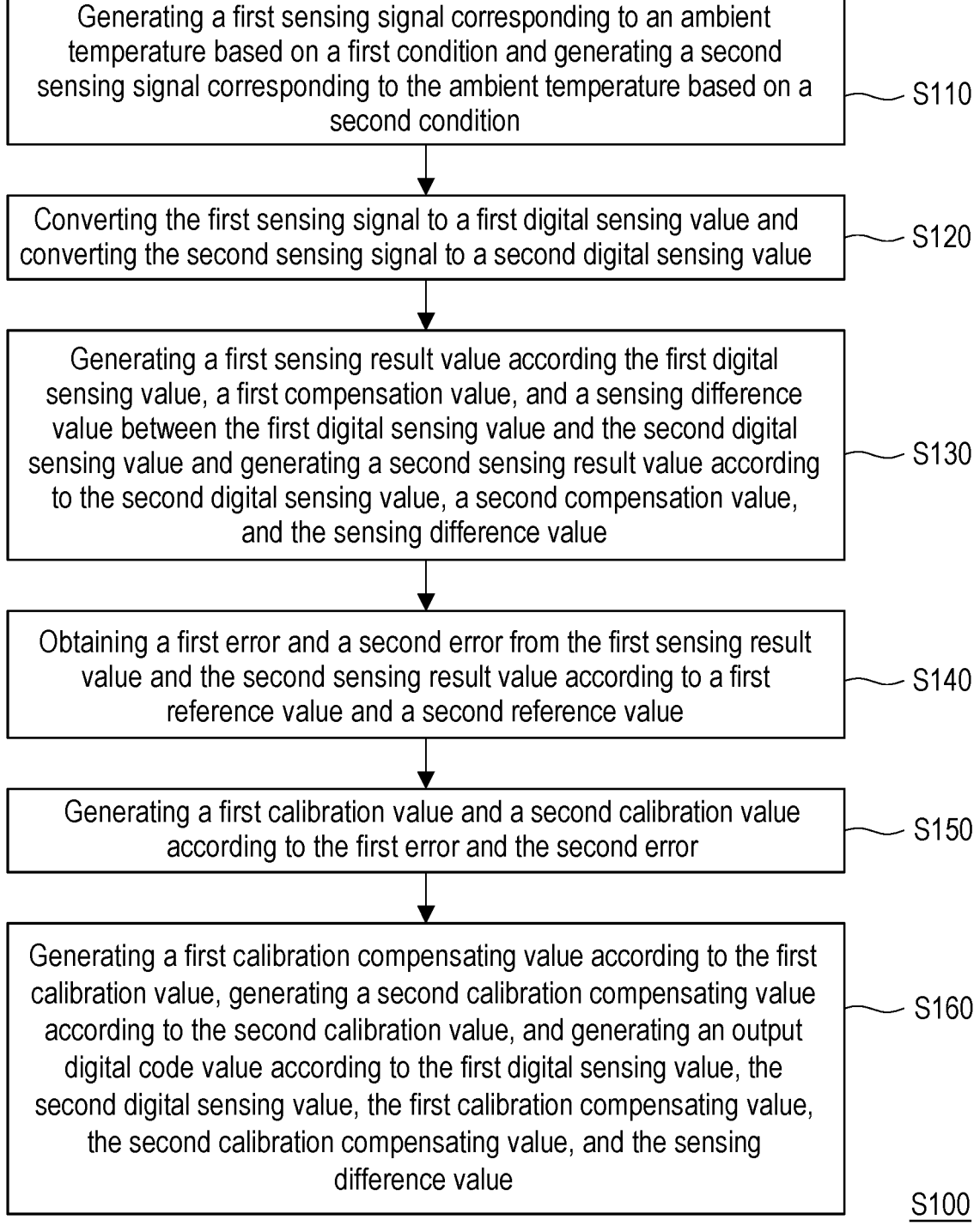

Generating a first sensing signal corresponding to an ambient temperature based on a first condition and generating a second sensing signal corresponding to the ambient temperature based on a second condition ⟶ S110

Converting the first sensing signal to a first digital sensing value and converting the second sensing signal to a second digital sensing value ⟶ S120

Generating a first sensing result value according the first digital sensing value, a first compensation value, and a sensing difference value between the first digital sensing value and the second digital sensing value and generating a second sensing result value according to the second digital sensing value, a second compensation value, and the sensing difference value ⟶ S130

Obtaining a first error and a second error from the first sensing result value and the second sensing result value according to a first reference value and a second reference value ⟶ S140

Generating a first calibration value and a second calibration value according to the first error and the second error ⟶ S150

Generating a first calibration compensating value according to the first calibration value, generating a second calibration compensating value according to the second calibration value, and generating an output digital code value according to the first digital sensing value, the second digital sensing value, the first calibration compensating value, the second calibration compensating value, and the sensing difference value ⟶ S160

TEMPERATURE SENSING DEVICE AND CALIBRATION METHOD THEREOF

CROSS-REFERENCE TO RELATED APPLICATION

This application claims the priority benefit of Taiwan patent application serial no. 112113966, filed on Apr. 14, 2023. The entirety of the above-mentioned patent application is hereby incorporated by reference herein and made a part of this specification.

BACKGROUND

Technical Field

The disclosure relates to a sensing device; more particularly, the disclosure relates to a temperature sensing device and a calibration method of the temperature sensing device.

Description of Related Art

Generally, a temperature sensing device senses a temperature through a sensor to generate at least one sensing signal corresponding to the temperature. The temperature sensing device converts this sensing signal to an output value. The sensing signal may include an error. The error may affect the output value, thereby reducing a sensing accuracy of the temperature sensing device.

SUMMARY

The disclosure provides a temperature sensing device and a calibration method of the temperature device capable of improving sensing accuracy of the temperature sensing device.

In an embodiment of the disclosure, a temperature sensing device including a sensor, a converter, a sensing result generating circuit, an error circuit, a calibration circuit, and an output circuit is provided. The sensor generates a first sensing signal corresponding to an ambient temperature based on a first condition and generates a second sensing signal corresponding to the ambient temperature based on a second condition, where the first sensing signal is different from the second sensing signal. The converter is coupled to the sensor. Here, the converter converts the first sensing signal to a first digital sensing value and converts the second sensing signal to a second digital sensing value. The sensing result generating circuit is coupled to the converter. Here, the sensing result generating circuit generates a first sensing result value according to the first digital sensing value, a first compensation value, and a sensing difference value between the first digital sensing value and the second digital sensing value and generates a second sensing result value according to the second digital sensing value, a second compensation value, and the sensing difference value. The error circuit is coupled to the sensing result generating circuit and obtains a first error and a second error from the first sensing result value and the second sensing result value according to a first reference value and a second reference value. The calibration circuit is coupled to the error circuit and generates a first calibration value and a second calibration value according to the first error and the second error. The output circuit is coupled to the calibration circuit and the converter. Here, the output circuit generates a first calibration compensating value according to the first calibration value, generates a second calibration compensating value according to the second calibration value, and generates an output digital code value according to the first digital sensing value, the second digital sensing value, the first calibration compensating value, the second calibration compensating value, and the sensing difference value.

In an embodiment of the disclosure, a calibration method adapted to a temperature sensing device is provided. The calibration method includes following steps. A first sensing signal corresponding to an ambient temperature is generated by a sensor based on a first condition, and a second sensing signal corresponding to the ambient temperature is generated by the sensor based on a second condition, where the first sensing signal is different from the second sensing signal. The first sensing signal is converted to a first digital sensing value, and the second sensing signal is converted to a second digital sensing value. A first sensing result value is generated according to the first digital sensing value, a first compensation value, and a sensing difference value between the first digital sensing value and the second digital sensing value, and a second sensing result value is generated according to the second digital sensing value, a second compensation value, and the sensing difference value. A first error and a second error are obtained from the first sensing result value and the second sensing result value according to a first reference value and a second reference value. A first calibration value and a second calibration value are generated according to the first error and the second error. A first calibration compensating value is generated according to the first calibration value, a second calibration compensating value is generated according to the second calibration value, and an output digital code value is generated according to the first digital sensing value, the second digital sensing value, the first calibration compensating value, the second calibration compensating value, and the sensing difference value.

In view of the above, the temperature sensing device provided in one or more embodiments of the disclosure determines the first error of the first sensing signal and the second error according to the first sensing result value, the second sensing result value, the first reference value, and the second reference value and calibrates the first compensation value according to the first error and the second error, so as to improve the sensing accuracy of the temperature sensing device.

To make the above more comprehensible, several embodiments accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 4 is a flowchart illustrating a calibration method according to an embodiment of the disclosure.

DESCRIPTION OF THE EMBODIMENTS

Figure 1:
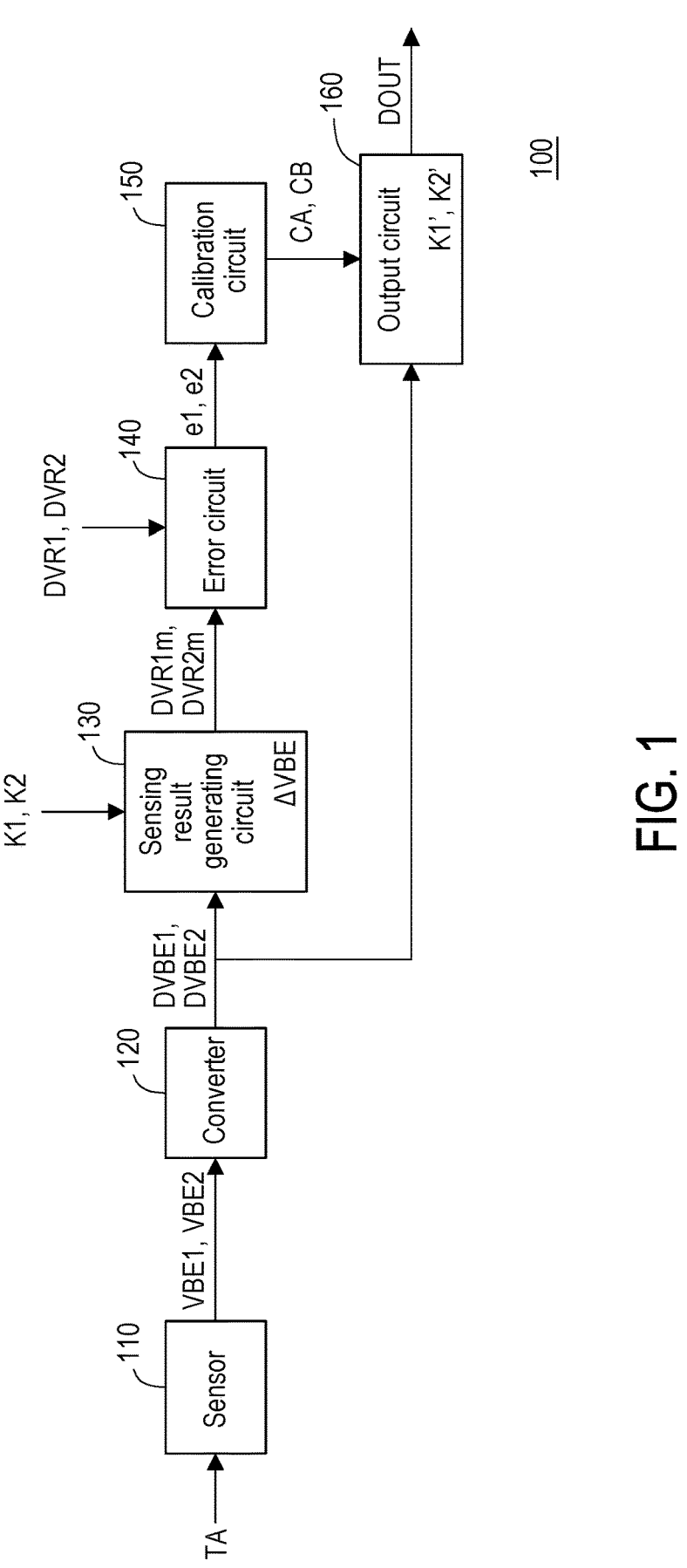
FIG. 1 is a schematic view illustrating a temperature sensing device according to a first embodiment of the disclosure.

Some embodiments provided in the disclosure will be described in detail with reference of the accompanying drawings. The reference numbers in the following description are regarded as directing to the same or similar elements when the same reference numbers appear in different drawings. These embodiments are only a part of the invention, and not all of the possible implementations of the invention are disclosed. To be more precise, these embodiments serve as examples of methods and devices within the scope provided in the claims. Please refer to FIG. 1, which is a schematic view illustrating a temperature sensing device according to a first embodiment of the disclosure. In this embodiment, a temperature sensing device 100 includes a sensor 110, a converter 120, a sensing result generating circuit 130, an error circuit 140, a calibration circuit 150, and an output circuit 160. The sensor 110 senses an ambient temperature TA. The sensor 110 generates a first sensing signal VBE1 corresponding to the ambient temperature TA based on a first condition and generates a second sensing signal VBE2 corresponding to the ambient temperature TA based on a second condition.

In this embodiment, the first condition is not the same as the second condition. Therefore, the first sensing signal VBE1 is different from the second sensing signal VBE2. The first condition and the second condition are a first sensing sensitivity and a second sensing sensitivity of the sensor 110, respectively. The first sensing sensitivity of the sensor 110 is designed to be different from the second sensing sensitivity. In this embodiment, the sensing sensitivity on the first condition is designed to be higher than the sensing sensitivity on the second condition. For instance, in this exemplary embodiment, the first sensing signal VBE1 and the second sensing signal VBE2 are analog voltage signals, respectively, which should not be construed as a limitation in the disclosure. In some embodiments, the first sensing signal VBE1 and the second sensing signal VBE2 are analog current signals, respectively.

In this embodiment, the converter 120 is coupled to the sensor 110. The converter 120 receives the first sensing signal VBE1 and the second sensing signal VBE2 from the sensor 110. The converter 120 converts the first sensing signal VBE1 to a first digital sensing value DVBE1 and converts the second sensing signal VBE2 to a second digital sensing value DVBE2. According to this embodiment, the converter 120 may be implemented in form of an analog-to-digital converter (ADC).

In this embodiment, the sensing result generating circuit 130 is coupled to the converter 120. The sensing result generating circuit 130 receives the first digital sensing value DVBE1 and the second digital sensing value DVBE2 from the converter 120. The sensing result generating circuit 130 further receives a first compensation value K1 and a second compensation value K2. The sensing result generating circuit 130 obtains a sensing difference value ΔVBE between the first digital sensing value DVBE1 and the second digital sensing value DVBE2. According to the first digital sensing value DVBE1, the first compensation value K1, and the sensing difference value ΔVBE, the sensing result generating circuit 130 generates a first sensing result value DVR1m. According to the second digital sensing value DVBE2, the second compensation value K2, and the sensing difference value ΔVBE, the sensing result generating circuit 130 generates a second sensing result value DVR2m. In this embodiment, the first compensation value K1 and the second compensation value K2 are predetermined values obtained by simulation in advance. In other words, the first compensation value K1 and the second compensation value K2 are theoretical values, respectively.

The error circuit 140 is coupled to the sensing result generating circuit 130. The error circuit 140 receives the first reference value DVR1, the second reference value DVR2, the first sensing result value DVR1m, and the second sensing result value DVR2m. The error circuit 140 obtains the first error e1 and the second error e2 from the first sensing result value DVR1m and the second sensing result value DVR2m according to the first reference value DVR1 and the second reference value DVR2.

The first reference value DVR1 is a first sensing theoretical value based on the first condition. The second reference value DVR2 is a second sensing theoretical value based on the second condition when no error occurs. That is, on the condition that no error occurs, the first digital sensing value DVBE1 is equal to the first reference value DVR1; the second digital sensing value DVBE2 is equal to the second reference value DVR2.

In this embodiment, the first digital sensing value DVBE1 and the second digital sensing value DVBE2 are actual results of the sensing values. The first digital sensing value DVBE1 includes the first error e1 and the second error e2. The second digital sensing value DVBE2 includes the first error e1. That is, the sum of the first error e1 and the second error e2 is an error between the first digital sensing value DVBE1 and the first reference value DVR1. The second error e2 is an error between the second sensing signal VSE2 and the second reference value DVR2. In this embodiment, the first error e1 and the second error e2 are error values which are changed together with at least one of a manufacturing process of the device, the ambient temperature TA, and design, respectively.

In this embodiment, the calibration circuit 150 is coupled to the error circuit 140. The calibration circuit 150 generates the first calibration value CA and the second calibration value CB according to the first error e1 and the second error e2.

In this embodiment, the output circuit 160 is coupled to the calibration circuit 150 and the converter 120. The output circuit 160 generates a first calibration compensating value K1' according to the first calibration value CA and generates a second calibration compensating value K2' according to the second calibration value CB. The output circuit 160 generates an output digital code value DOUT according to the first digital sensing value DVBE1, the second digital sensing value DVBE2, the first calibration compensating value K1', the second calibration compensating value K2', and the sensing difference value ΔVBE.

It is worth mentioning that the temperature sensing device 100 obtains the first error e1 and the second error e2 from the first sensing result value DVR1m and the second sensing result value DVR2m according to the first reference value DVR1 and the second reference value DVR2 and calibrates the first compensation value K1 based on the determined first error e1 and the determined second error e2. The first sensing result value DVR1m is calibrated in response to the calibrated first compensation value K1 to eliminate the first error e1 and the second error e2. Therefore, the result of the output digital code value DOUT is not affected by the first error e1 and the second error e2 and is thus not distorted. As such, the sensing accuracy of the temperature sensing device 100 may be improved.

Figure 2:
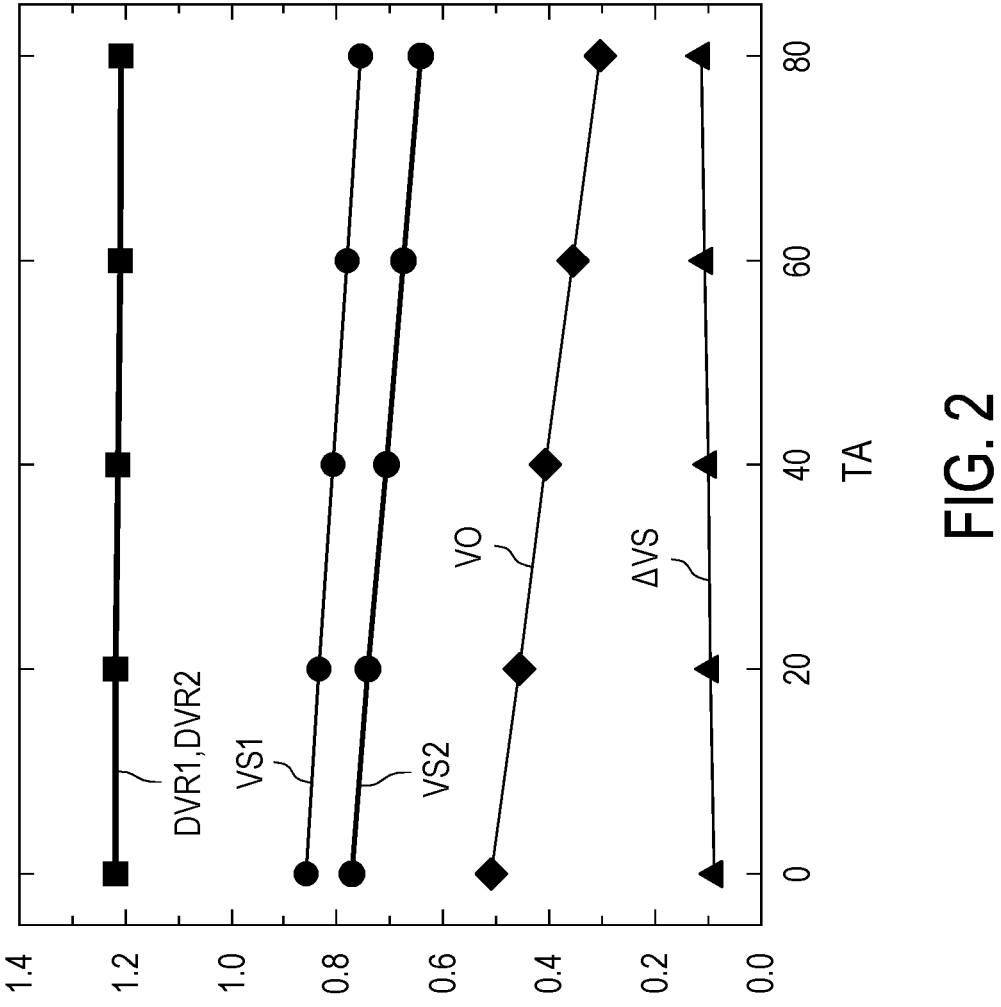
FIG. 2 is a schematic view illustrating a first reference signal, a second reference signal, a referential difference value, a first reference value, a second reference value, and an output value according to an embodiment of the disclosure.

Please refer to FIG. 1 and FIG. 2. FIG. 2 is a schematic view illustrating a first reference theoretical value, a second reference theoretical value, a referential difference value, a first reference value, a second reference value, and an output value according to an embodiment of the disclosure. FIG. 2 shows a temperature tendency of a first sensing theoretical value VS1, a second sensing theoretical value VS2, a referential difference value $\Delta VS$, the first reference value DVR1, the second reference value DVR2, and an output value VO (i.e., the output digital code value DOUT). The first sensing theoretical value VS1 is different from the second sensing theoretical value VS2. The referential difference value $\Delta VS$ is the difference value between the first sensing theoretical value VS1 and the second sensing theoretical value VS2. In this embodiment, the first reference value DVR1 may be obtained according to the first compensation value K1, the first sensing theoretical value VS1, and the referential difference value $\Delta VS$. The second reference value DVR1 may be obtained according to the second compensation value K2, the second sensing theoretical value VS2, and the referential difference value $\Delta VS$.

In this embodiment, the first sensing theoretical value VS1 and the second sensing theoretical value VS2 respectively represent a linear negative correlation with the ambient temperature TA. The first sensing theoretical value VS1 and the second sensing theoretical value VS2 respectively have different values in response to the ambient temperature TA, and therefore the referential difference value $\Delta VS$ is a difference value not equal to 0. The reference circuit 120 may obtain the first reference value DVR1 according to Formula (1) and obtain the second reference value DVR2 according to Formula (2).

$$DVR1 = VS1 + K1 \times \Delta VS \qquad \text{Formula (1)}$$

$$DVR2 = VS2 + K2 \times \Delta VS \qquad \text{Formula (2)}$$

In this embodiment, calculations using Formulae (1) and (2) may be performed by an external simulation circuit (not shown).

The external simulation circuit multiplies the first compensation value K1 by the referential difference value $\Delta VS$ to generate a first product and adds the first product to the first sensing theoretical value VS1 to generate the first reference value DVR1. The external simulation circuit multiplies the second compensation value K2 by the referential difference value $\Delta VS$ to generate a second product and adds the second product to the second sensing theoretical value VS2 to generate the second reference value VR2. In this embodiment, the first reference value DVR1 and the second reference value VR2 are set to be the same fixed value. Therefore, the first compensation value K1 and the second compensation value K2 can be determined.

As shown in the embodiment depicted in FIG. 1, the sensing result generating circuit 130 receives the first digital sensing value DVBE1, the second digital sensing value DVBE2, the first compensation value K1, and the second compensation value K2. The sensing result generating circuit 130 may obtain the first sensing result value DVR1m according to Formula (3) and obtain the second sensing result value DVR2m according to Formula (4).

$$DVR1m = \frac{DVBE1 + K1 \times \Delta VBE}{1 + dV} \qquad \text{Formula (3)}$$

-continued $$DVR2m = \frac{DVBE2 + K2 \times \Delta VBE}{1 + dV} \qquad \text{Formula (4)}$$

The sensing result generating circuit 130 multiplies the first compensation value K1 by the referential difference value $\Delta VBE$ to generate a third product and adds the third product to the first digital sensing value DVBE1 to generate the first sensing result value DVR1m. The sensing result generating circuit 130 multiplies the second compensation value K2 by the sensing difference value $\Delta VBE$ to generate a fourth product and adds the fourth product to the second digital sensing value DVBE2 to generate the second sensing result value DVR2m. In addition, Formulae (3) and (4) include a third error dV. The existence of the third error dV poses an impact on the first sensing result value DVR1m and the second sensing result value DVR2m. In some embodiments, the third error dV does not exist. Formulae (3) and (4) provided in one or more embodiments of the disclosure are not limited to include the third error dV.

In this embodiment, the first digital sensing value DVBE1 includes the first reference signal VBE1, the first error e1, and the second error e2. The second sensing signal VSE2 includes the second reference signal VBE2 and the first error e1. The first digital sensing value DVBE1 is shown in Formula (5). The second sensing signal VSE2 is shown in Formula (6).

$$DVBE1 = VS1 + e1 + e2 \qquad \text{Formula (5)}$$

$$DVBE1 = VS2 + e1 \qquad \text{Formula (6)}$$

Therefore, Formula (5) is substituted into Formula (3) to generate Formula (7).

$$DVR1m = \frac{(VS1 + e1 + e2) + K1 \times (\Delta VS + e2)}{1 + dV} \qquad \text{Formula (7)}$$

After that, according to Formula (1), Formula (7) is simplified to Formula (7').

$$DVR1m = \frac{DVR1 + e1 + e2 + K1 \times e2}{1 + dV} \qquad \text{Formula (7')}$$

Similarly, Formula (6) is substituted into Formula (4) to generate Formula (8).

$$DVR2m = \frac{(VS2 + e1) + K2 \times (\Delta VS + e2)}{1 + dV} \qquad \text{Formula (8)}$$

According to Formula (2), Formula (8) is simplified to Formula (8').

$$DVR2m = \frac{DVR2 + e1 + K2 \times e2}{1 + dV} \qquad \text{Formula (8')}$$

In this embodiment, the sum of the first error e1 and the second error e2 is a sensing error value between the first digital sensing value DVBE1 and the first sensing theoretical value VS1. The second error e2 is, for instance, an error value between the sensing difference value ΔVBE and the referential difference value ΔVS. In addition, the third error dV is, for instance, an error value of a bandgap voltage. Generally, the third error dV is far less than 1.

In this embodiment, the error circuit 140 determines the first error e1 and the second error e2 according to the first sensing result value DVR1m, the second sensing result value DVR2m, the first reference value DVR1, and the second reference value DVR2. The error circuit 140 divides the first sensing result value DVR1m by the first reference value DVR1 to generate a first quotient, as shown by Formula (9). That is, Formula (9) is a result obtained by dividing Formula (7') by the first reference value DVR1.

$$X1 = \frac{DVR1m}{DVR1} = \frac{1 + \frac{e1 + e2 + K1 \times e2}{VR1}}{1 + dV} \qquad \text{Formula (9)}$$

X1 refers to the first quotient. Besides, if it is assumed that the third error dV is much smaller than 1, Formula (9) may be approximated as Formula (9').

$$X1 \cong \left(1 + \frac{e1 + e2 + K1 \times e2}{DVR1}\right) \times (1 - dV) \cong \qquad \text{Formula (9')}$$

$$1 + \frac{e1 + e2 + K1 \times e2}{DVR1} - dV$$

The error circuit 140 divides the second sensing result value DVR2m by the second reference value DVR2 to generate a second quotient, as shown by Formula (10). That is, Formula (10) is a result obtained by dividing Formula (8') by the second reference value DVR2.

$$X2 = \frac{DVR2m}{DVR2} = \frac{1 + \frac{e1 + K2 \times e2}{VR2}}{1 + dV} \qquad \text{Formula (10)}$$

X2 refers to the second quotient. Similarly, if it is assumed that the third error dV is much smaller than 1, Formula (10) may be approximated as Formula (10').

$$X2 \cong \left(1 + \frac{e1 + K2 \times e2}{DVR2}\right) \times (1 - dV) \cong \qquad \text{Formula (10')}$$

$$1 + \frac{e1 + K2 \times e2}{DVR2} - dV$$

The error circuit 140 then subtracts Formula (10') from Formula (9') to obtain a difference value calculated by subtracting the second quotient from the first quotient, as shown by Formula (11).

$$X1 - X2 = \frac{e1 + e2 + K1 \times e2}{DVR1} - \frac{e1 + K2 \times e2}{DVR2} = \qquad \text{Formula (11)}$$

$$\left(\frac{1}{DVR2}\right) \times \left(\frac{DVR2}{DVR1} \times (e1 + e2 + K1 \times e2) - (e1 + K2 \times e2)\right)$$

It should be noted that the above difference value (i.e., X1–X2), the first reference value DVR1, the second reference value DVR2, the first compensation value K1, and the second compensation value K2 are all known. Therefore, the error circuit 140 may determine the second error e2 according to the above difference value (i.e., X1–X2), the first reference value DVR1, the second reference value DVR2, the first compensation value K1, and the second compensation value K2. Besides, for instance, if the first reference value DVR1 is equal to the second reference value DVR2, then Formula (11) is simplified to Formula (11').

$$X1 - X2 = \left(\frac{1}{VR2}\right) \times (1 + K1 - K2) \times e2 \qquad \text{Formula (11')}$$

According to the calculations using the above Formulae (11) and (11'), note that both the first error e1 and the third error dV are eliminated. Therefore, the error circuit 140 may determine the second error e2 according to the above difference value (i.e., X1–X2), the second reference value VR2, the first compensation value K1, and the second compensation value K2.

In addition, the error circuit 140 divides the first sensing result value DVR1m by the second sensing result value DVR2m to generate a third quotient, as shown in Formula (12). That is, Formula (12) is the result obtained by dividing Formula (7') by Formula (8').

$$\frac{DVR1m}{DVR2m} = \frac{DVR1 + e1 + e2 + K1 \times e2}{DVR2 + e1 + K2 \times e2} \qquad \text{Formula (12)}$$

Hence, the formula of the first error e1 is as shown by Formula (13).

$$e1 = \frac{DVR1 + e2 + K1 \times e2 - \left(\frac{DVR1m}{DVR2m}\right) \times (DVR2 + K2 \times e2)}{\left(\frac{DVR1m}{DVR2m} - 1\right)} \qquad \text{Formula (13)}$$

Therefore, the error circuit 140 determines the first error e1 according to the third quotient, the first reference value VR1, the second reference value VR2, the first compensation value K1, the second compensation value K2, and the determined second error e2.

When the first compensation value K1 has not yet been calibrated, an output value generate circuit 250 generates the output digital code value DOUT according to Formula (14). In other words, when the first compensation value K1 has not been calibrated, the output value generating circuit 250 generates a first value V1 by subtracting the product of the first compensation value K1 and the sensing difference value ΔVBE from the first digital sensing value DVBE1. The output value generating circuit 250 also adds the first digital sensing value DVBE1 to the first compensation value K1 and the sensing difference value ΔVBE to generate a second value V2 and divides the first value by the second value V2 to generate the output digital code value DOUT.

$$DOUT = \frac{V1}{V2} = \frac{DVBE1 - K1 \times \Delta VBE}{DVBE2 + K1 \times \Delta VBE} \qquad \text{Formula (14)}$$

V1 represents the first value, and V2 represents the second value. According to Formulae (5) and (6), Formula (14) is expanded into Formula (15).

9
10

$$DOUT = \frac{VS1 + e1 + e2 - K1 \times (\Delta VS + e2)}{VS1 + e1 + e2 + K1 \times (\Delta VS + e2)} \qquad \text{Formula (15)}$$

It can be known from Formula (15) that the first error e1 and the second error e2 affect the output digital code value DOUT. Therefore, the first compensation value K1 in Formula (15) should be calibrated to eliminate the first error e1 and the second error e2. As such, the output digital code value DOUT is not affected by the first error e1 and the second error e2 and is thus not distorted.

In the present embodiment, in order to compensate the first compensation value K1, Formula (15) is adjusted to Formula (16), and the calibration circuit 150 generates the first calibration value CA and the second calibration value CB according to Formula (15).

$$DOUT = \frac{VS1 + e1 + e2 - (K1 + CA) \times (\Delta VS + e2)}{VS1 + e1 + e2 + (K1 + CB) \times (\Delta VS + e2)} \qquad \text{Formula (16)}$$

As a result, the first calibration compensating value K1' is equal to the sum of the first compensation value K1 and the first calibration value CA (i.e., K1'=K1+CA). The second calibration compensating value K2' is equal to the sum of the first compensation value K1 and the second calibration value CB (i.e., K2'=K1+CB).

In this embodiment, Formula (16) is expanded into Formulae (17)-(19).

$$DOUT = \frac{(VS1 - K1 \times \Delta VS) + EA}{(VS1 + K1 \times \Delta VS) + EB} \qquad \text{Formula (17)}$$

$$EA = e1 + e2 - CA \times \Delta VS - e2(K1 + CA) \qquad \text{Formula (18)}$$

$$EB = e1 + e2 + CB \times \Delta VS + e2(K1 + CB) \qquad \text{Formula (19)}$$

EA and EB are variation parts associated with the first error e1 and the second error e2, respectively. It should be noted that from Formulae (17)-(19), it is clear that if the variation parts EA and EB are equal to 0, variation errors of the output digital code value DOUT are eliminated, as shown in Formulae (20) and (21). Therefore, if the variation parts EA and EB are equal to 0, the output digital code value DOUT approaches the expected theoretical value. As a result, the calibration circuit 150 obtains the first calibration value CA and the second calibration value CB according to the referential difference value $\Delta VS$, the determined first error e1, the determined second error e2, and the first compensation value K1.

$$EA = e1 + e2 - CA \times \Delta VS - e2(K1 + CA) = 0 \qquad \text{Formula (20)}$$

$$EB = e1 + e2 + CB \times \Delta VS + e2(K1 + CB) = 0 \qquad \text{Formula (21)}$$

Based on the above, the first calibration value CA and the second calibration value CB may serve to calibrate the first compensation value K1, thereby eliminating unstable output caused by the first error e1 and the second error e2.

Once the first calibration value CA and the second calibration value CB are known, the output circuit 160 adds the first compensation value K1 to the first calibration value CA to generate the first calibration compensating value K1' and adds the first compensation value K1 to the second calibration value CB to generate the second calibration compensating value K2'. The output circuit 160 generates the output digital code value DOUT according to Formula (22).

$$DOUT = \frac{(DVBE1 - K1' \times \Delta VBE)}{(DVBE1 + K2' \times \Delta VBE)} \qquad \text{Formula (22)}$$

According to Formula (22), the output circuit 160 multiplies the first calibration compensating value K1' by the sensing difference value $\Delta VBE$ to generate a first compensation product (i.e., K1'×$\Delta VBE$), subtracts the first compensation product from the first digital sensing value DVBE1 to generate the first value V1, multiplies the second calibration compensating value by the sensing difference value to generate a second compensation product (i.e., K2'×$\Delta VBE$), adds the second compensation product to the first digital sensing value DVBE1 to generate the second value V2, and divides the first value V1 by the second value V2 to generate the output digital code value DOUT.

Figure 3:
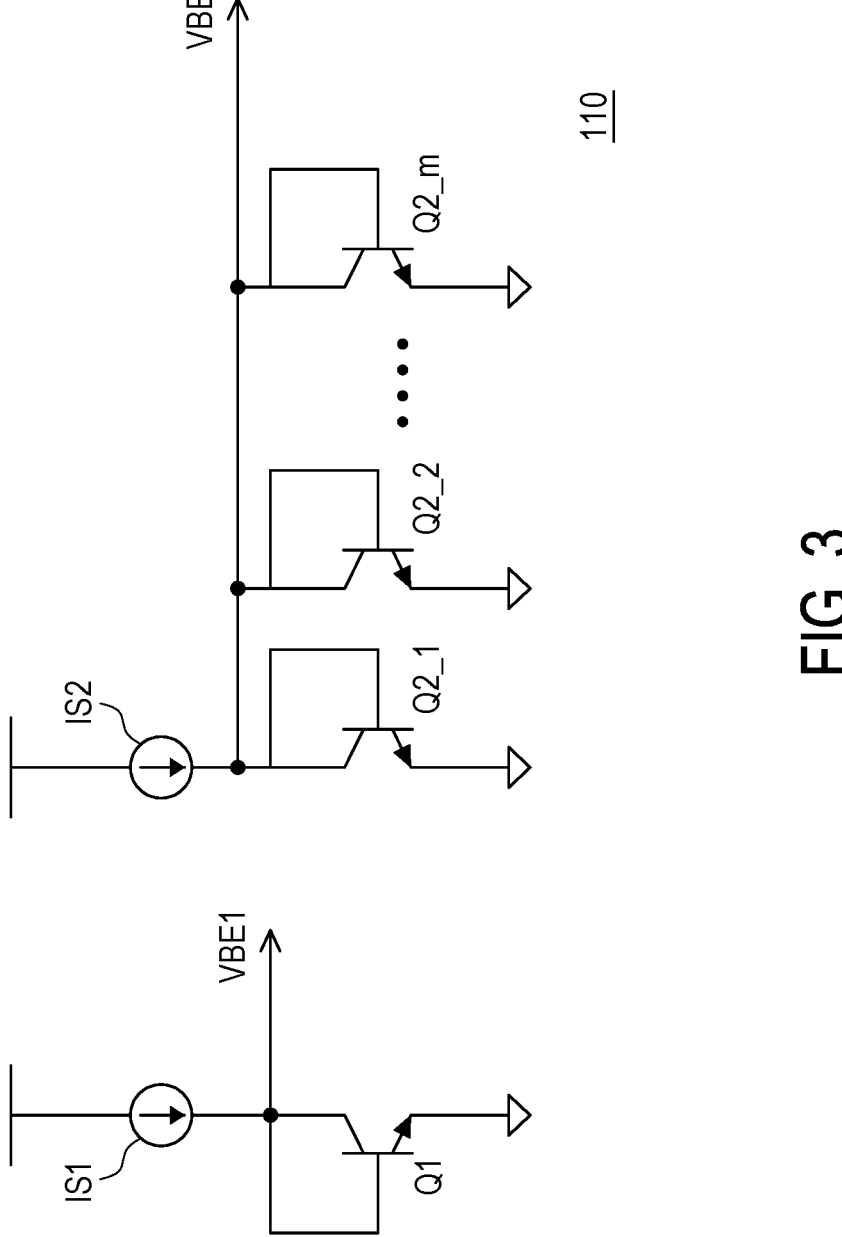
FIG. 3 is a schematic view illustrating a circuit of a sensor according to an embodiment of the disclosure.

Please refer to FIG. 1 and FIG. 3. FIG. 3 is a schematic view illustrating a circuit of a sensor according to an embodiment of the disclosure. In this embodiment, the sensor 110 includes a first current source IS1 and a first bipolar transistor Q1. A base of the first bipolar transistor Q1 is coupled to a collector of the first bipolar transistor Q1, the converter 120, and the first current source IS1. An emitter of the first bipolar transistor Q1 is coupled to a reference low potential (e.g., grounded). In this embodiment, the sensor 110 may provide the first condition by configuring the first current source IS1 and the first bipolar transistor Q1. The base and the collector of the first bipolar transistor Q1 collectively serve as a first output terminal of the sensor 110. The sensor 110 provides the first sensing signal VBE1 to the converter 120 via the first output terminal. The first bipolar transistor Q1 provided in this embodiment is implemented in form of an NPN bipolar transistor.

In some embodiments, the first bipolar transistor Q1 may be replaced by a diode. For instance, an anode of the diode is coupled to the first current source IS1 and the converter 120. The anode of the diode serves as the first output terminal of the sensor 110. A cathode of the diode is coupled to the reference low potential.

In some embodiments, the first bipolar transistor Q1 may be replaced by an n-type field effect transistor of any form. For instance, a gate of the n-type field effect transistor is coupled to a drain of the n-type field effect transistor, the first current source IS1, and the converter 120. The gate and the drain of the n-type field effect transistor collectively serve as the first output terminal of the sensor 110. A source of the n-type field effect transistor is coupled to the reference low potential.

In this embodiment, the sensor 110 further includes a second current source IS2 and second bipolar transistors Q2_1-Q2_m. A base of the second bipolar transistor Q2_1 is coupled to a collector of the second bipolar transistor Q2_1, the converter 120, and the second current source IS2. An emitter of the second bipolar transistor Q2_1 is coupled to the reference low potential. A base of the second bipolar transistor Q2_2 is coupled to a collector of the second bipolar transistor Q2_2, the converter 120, and the second current source IS2. An emitter of the second bipolar transistor Q2_2 is coupled to the reference low potential, and the rest may be deduced therefrom. That is, the second bipolar transistors Q2_1-Q2_m are respectively connected to each other in a diode-connected manner and are connected in parallel with each other. In this embodiment, the sensor 110 may provide the second condition different from the first condition by configuring the second current source IS2 and the second bipolar transistors Q2_1-Q2_m.

The bases and the collectors of the second bipolar transistors Q2_1-Q2_m collectively serve as the second output terminal of the sensor 110. The sensor 110 provides the second sensing signal VBE2 to the converter 120 via the second output terminal. The second bipolar transistor Q2_1-Q2_m of this embodiment is realized by NPN bipolar transistor respectively.

In this embodiment, a current value provided by the first current source IS1 may be greater than a current value provided by the second current source IS2.

In some embodiments, the second bipolar transistors Q2_1-Q2_m may be replaced by a diode, respectively. For instance, anodes of the diodes are commonly coupled to the first current source IS1 and the converter 120. The anodes of the diodes collectively serve as the second output terminal of the sensor 110. Cathodes of the diodes are commonly coupled to the reference low potential.

In some embodiments, the second bipolar transistors Q2_1-Q2_m may be replaced by the n-type field effect transistor of any form, respectively. For instance, gates of the n-type field effect transistors are respectively coupled to drains of the n-type field effect transistors, the first current source IS1, and the converter 120. The gates and the drains of the n-type field effect transistors collectively serve as the second output terminal of the sensor 110. Sources of the n-type field effect transistors are coupled to the reference low potential.

For the sake of explanation, the number of the first bipolar transistor Q1 in this embodiment is set as 1, for instance. The number of the first bipolar transistors may be plural according to one or more embodiments of the disclosure, and the number of the first bipolar transistors is less than the number of the second bipolar transistors. The number of the first bipolar transistors is not limited to what is provided in this embodiment.

Please refer to FIG. 1 and FIG. 4. FIG. 4 is a flowchart illustrating a calibration method according to an embodiment of the disclosure. In this embodiment, a calibration method S100 is adapted to the temperature sensing device 100, for instance. In step S110, the sensor 110 generates the first sensing signal VBE1 corresponding to the ambient temperature TA based on the first condition and generates the second sensing signal VBE2 corresponding to the ambient temperature TA based on the second condition.

In step S120, the converter 120 converts the first sensing signal VBE1 to the first digital sensing value DVBE1 and converts the second sensing signal VBE2 to the second digital sensing value DVBE2.

In step S130, the sensing result generating circuit 130 obtains the sensing difference value ΔVBE between the first digital sensing value DVBE1 and the second digital sensing value DVBE2. The sensing result generating circuit 130 generates the first sensing result value DVR1m according the first digital sensing value DVBE1, the first compensation value K1, and the sensing difference value ΔVBE between the first digital sensing value DVBE1 and the second digital sensing value DVBE2. The sensing result generating circuit 130 also generates the second sensing result value DVR2m according to the second digital sensing value DVBE2, the second compensation value K2, and the sensing difference value ΔVBE.

In step S140, the error circuit 140 obtains the first error e1 and the second error e2 from the first sensing result value DVR1m and the second sensing result value DVR2m according to the first reference value DVR1 and the second reference value DVR2.

In step S150, the calibration circuit 150 generates the first calibration value CA and the second calibration value CB according to the first error e1 and the second error e2.

In step S160, the output circuit 160 generates the first calibration compensating value K1' according to the first calibration value CA and generates the second calibration compensating value K2' according to the second calibration value CB. The output circuit 160 generates the output digital code value DOUT according to the first digital sensing value DVBE1, the second digital sensing value DVBE2, the first calibration compensating value K1', the second calibration compensating value K2', and the sensing difference value ΔVBE.

Implementation details of steps S110-S160 are sufficiently taught in the embodiments depicted in FIG. 1 to FIG. 3 and thus will not be further explained hereinafter.

To sum up, the temperature sensing device provided in one or more embodiments of the disclosure determines the first error and the second error according to the first sensing result value, the second sensing result value, the first reference value, and the second reference value. The temperature sensing device calibrates the first compensation value according to the first error and the second error, so as to generate the calibration compensating value. According to the calibration compensating value, the temperature sensing device is able to eliminate the first error and the second error. Thereby, the sensing accuracy of the temperature sensing device may be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A temperature sensing device, comprising:
   a sensor, configured to generate a first sensing signal corresponding to an ambient temperature based on a first condition and generate a second sensing signal corresponding to the ambient temperature based on a second condition, wherein the first sensing signal is different from the second sensing signal;
   a converter, coupled to the sensor and configured to convert the first sensing signal to a first digital sensing value and convert the second sensing signal to a second digital sensing value;
   a sensing result generating circuit, coupled to the converter and configured to generate a first sensing result value according to the first digital sensing value, a first compensation value, and a sensing difference value between the first digital sensing value and the second digital sensing value and generate a second sensing result value according to the second digital sensing value, a second compensation value, and the sensing difference value, wherein the first digital sensing value includes a first error and a second error, and the second digital sensing value includes the first error;
   an error circuit, coupled to the sensing result generating circuit and configured to obtain the first error and the second error from the first sensing result value and the second sensing result value according to a first reference value and a second reference value;

a calibration circuit, coupled to the error circuit and configured to generate a first calibration value and a second calibration value according to the first error and the second error; and an output circuit, coupled to the calibration circuit and the converter and configured to generate a first calibration compensating value according to the first calibration value, generate a second calibration compensating value according to the second calibration value, and generate an output digital code value according to the first digital sensing value, the second digital sensing value, the first calibration compensating value, the second calibration compensating value, and the sensing difference value.

2. The temperature sensing device according to claim 1, wherein the first digital sensing value comprises the first reference value, the first error, and the second error, and the second digital sensing value comprises the second reference value and the first error.

3. The temperature sensing device according to claim 1, wherein the error circuit divides the first sensing result value by the first reference value to generate a first quotient, divides the second sensing result value by the second reference value to generate a second quotient, and determines the second error according to a difference value obtained by subtracting the second quotient from the first quotient, the second reference value, the first compensation value, and the second compensation value.

4. The temperature sensing device according to claim 3, wherein the error circuit divides the first sensing result value by the second sensing result value to generate a third quotient and determines the first error according to the third quotient, the first reference value, the second reference value, and the determined second error.

5. The temperature sensing device according to claim 1, wherein:

the sensing result generating circuit multiplies the first compensation value by the sensing difference value to generate a first product and adds the first digital sensing value to the first product to generate the first sensing result value, and the sensing result generating circuit multiplies the second compensation value by the sensing difference value to generate a second product and adds the second digital sensing value to the second product to generate the second sensing result value.

6. The temperature sensing device according to claim 1, wherein the calibration circuit generates the first calibration value and the second calibration value according to the first error, the second error, the sensing difference value, and the first compensation value.

7. The temperature sensing device according to claim 1, wherein the output circuit multiplies the first calibration compensating value by the sensing difference value to generate a first compensation product, subtracts the first compensation product from the first digital sensing value to generate a first value, multiplies the second calibration compensating value by the sensing difference value to generate a second compensation product, adds the first digital sensing value to the second compensation product to generate a second value, and divides the first value by the second value to generate the output digital code value.

8. A calibration method adapted to a temperature sensing device and comprising:

generating a first sensing signal corresponding to an ambient temperature based on a first condition by a sensor, and generating a second sensing signal corresponding to the ambient temperature based on a second condition by the sensor, wherein the first sensing signal is different from the second sensing signal;

converting the first sensing signal to a first digital sensing value and converting the second sensing signal to a second digital sensing value;

generating a first sensing result value according to the first digital sensing value, a first compensation value, and a sensing difference value between the first digital sensing value and the second digital sensing value, and generating a second sensing result value according to the second digital sensing value, a second compensation value, and the sensing difference value, wherein the first digital sensing value includes a first error and a second error, and the second digital sensing value includes the first error;

obtaining the first error and the second error from the first sensing result value and the second sensing result value according to a first reference value and a second reference value;

generating a first calibration value and a second calibration value according to the first error and the second error; and generating a first calibration compensating value according to the first calibration value, generating a second calibration compensating value according to the second calibration value, and generating an output digital code value according to the first digital sensing value, the second digital sensing value, the first calibration compensating value, the second calibration compensating value, and the sensing difference value.

9. The calibration method according to claim 8, wherein the first digital sensing value comprises the first reference value, the first error, and the second error, and the second digital sensing value comprises the second reference value and the first error.

10. The calibration method according to claim 8, wherein the step of obtaining the first error and the second error from the first sensing result value and the second sensing result value according to the first reference value and the second reference value comprises:

dividing the first sensing result value by the first reference value to generate a first quotient;

dividing the second sensing result value by the second reference value to generate a second quotient; and determining the second error according to a difference value obtained by subtracting the second quotient from the first quotient, the second reference value, the first compensation value, and the second compensation value.

11. The calibration method according to claim 10, wherein the step of obtaining the first error and the second error from the first sensing result value and the second sensing result value according to the first reference value and the second reference value further comprises:

dividing the first sensing result value by the second sensing result value to generate a third quotient; and determining the first error according to the third quotient, the first reference value, the second reference value, and the determined second error.

12. The calibration method according to claim 9, wherein the step of generating the first sensing result value according to the first digital sensing value, the first compensation value, and the sensing difference value and generating the second sensing result value according to the second digital sensing value, the second compensation value, and the sensing difference value comprises:

multiplying the first compensation value by the sensing difference value to generate a first product and adding the first digital sensing value to the first product to generate the first sensing result value; and multiplying the second compensation value by the sensing difference value to generate a second product and adding the second digital sensing value to the second product to generate the second sensing result value.

13. The calibration method according to claim 8, wherein the step of generating the first calibration value and the second calibration value according to the first error and the second error comprises:

generating the first calibration value and the second calibration value according to the first error, the second error, the sensing difference value, and the first compensation value.

14. The calibration method according to claim 8, wherein the step of generating the output digital code value according to the first digital sensing value, the second digital sensing value, the first calibration compensating value, the second calibration compensating value, and the sensing difference value comprises:

multiplying the first calibration compensating value by the sensing difference value to generate a first compensation product;

subtracting the first compensation product from the first digital sensing value to generate a first value;

multiplying the second calibration compensating value by the sensing difference value to generate a second compensation product;

adding the first digital sensing value to the second compensation product to generate a second value; and dividing the first value by the second value to generate the output digital code value.

* * * * *